United States Patent
Burdeniuc et al.

(10) Patent No.: US 6,759,447 B1
(45) Date of Patent: *Jul. 6, 2004

(54) PHYSICAL PROPERTIES OF POLYURETHANE FOAMS USING TERTIARY AMINO ALKYL AMIDE CATALYSTS

(75) Inventors: Juan Jesus Burdeniuc, Macungie, PA (US); Mark Leo Listemann, Kutztown, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/338,184

(22) Filed: Jan. 6, 2003

(51) Int. Cl.$^7$ .............................................. C08G 18/28
(52) U.S. Cl. ..................... 521/128; 521/129; 521/130; 521/170
(58) Field of Search ................ 521/128, 129, 521/170, 130

(56) References Cited

U.S. PATENT DOCUMENTS

| | | | |
|---|---|---|---|
| 4,007,140 A | 2/1977 | Ibbotson | 260/2.5 |
| 4,012,445 A | 3/1977 | Priest et al. | 260/561 |
| 4,242,467 A | 12/1980 | Zimmerman | 521/129 |
| 4,644,017 A | 2/1987 | Haas et al. | 521/129 |
| 4,735,970 A | 4/1988 | Sommerfeld et al. | 521/129 |
| 5,124,367 A | 6/1992 | Barker et al. | 521/107 |
| 5,200,434 A | 4/1993 | Bailey, Jr. et al. | 521/129 |
| 5,302,303 A | 4/1994 | Clatty et al. | 252/6.5 |
| 5,374,486 A | 12/1994 | Clatty et al. | 428/423.1 |
| 5,489,618 A * | 2/1996 | Gerkin | 521/128 |
| 6,156,814 A * | 12/2000 | Chen et al. | 521/129 |
| 6,346,559 B1 * | 2/2002 | Thiele et al. | 521/128 |

* cited by examiner

Primary Examiner—John M. Cooney, Jr.
(74) Attorney, Agent, or Firm—Michael Leach

(57) ABSTRACT

The present invention relates to a method for preparing a polyurethane foam which comprises reacting an organic polyisocyanate and a polyol in the presence of water as a blowing agent, a cell stabilizer, a gelling catalyst, and a tertiary amino alkyl amide catalyst composition. The catalyst composition is represented by the formula I:

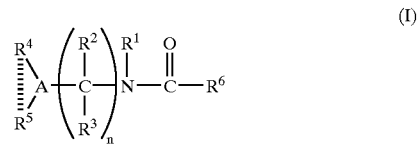

(I)

wherein $R^1$, $R^2$, $R^3$, $R^4$, $R^5$, $R^6$, A, and n are as defined herein.

19 Claims, No Drawings

PHYSICAL PROPERTIES OF POLYURETHANE FOAMS USING TERTIARY AMINO ALKYL AMIDE CATALYSTS

BACKGROUND OF THE INVENTION

The present invention relates to the use of tertiary amino alkyl amides as catalysts for producing polyurethane foams.

The present invention relates to tertiary amino alkyl amide catalysts for producing polyurethane foams. Polyurethane foams are widely known and used in automotive, housing and other industries. Such foams are produced by reaction of a polyisocyanate with a polyol in the presence of various additives. One such additive is a chlorofluorocarbon (CFC) blowing agent that vaporizes as a result of the reaction exotherm causing the polymerizing mass to form a foam. The discovery that CFCs deplete ozone in the stratosphere has resulted in mandates diminishing CFC use. Production of water blown foams, in which blowing is performed with carbon dioxide ($CO_2$) generated by the reaction of water with the polyisocyanate, has therefore become increasingly important. Tertiary amine catalysts are typically used to accelerate blowing (reaction of water with polyisocyanate to generate $CO_2$) and gelling (reaction of polyol with isocyanate).

The ability of the tertiary amine catalyst to selectively promote either blowing or gelling is an important consideration in selecting a catalyst for the production of a particular polyurethane foam. If a catalyst promotes the blowing reaction to a too high degree, much of the $CO_2$ will be evolved before sufficient reaction of isocyanate with polyol has occurred, and the $CO_2$ will bubble out of the formulation, resulting in collapse of the foam. A foam of poor quality will be produced. In contrast, if a catalyst too strongly promotes the gelling reaction, a substantial portion of the $CO_2$ will be evolved after a significant degree of polymerization has occurred. Again, a poor quality foam will be produced, this time characterized by high density, broken or poorly defined cells, and other undesirable features.

Tertiary amine catalysts generally are malodorous and offensive and many have high volatility due to their low molecular weight. Release of the tertiary amine during the foam processing may present significant safety and toxicity problems, and release of residual amine from customer products is generally undesirable.

Amine catalysts which contain amide functionality derived from carboxylic acids with long chain alkyl groups ($C_6$ or higher) and fatty acids have an increased molecular weight and hydrogen bonding ability and reduced volatility and odor when compared with related structures which lack this functionality. Furthermore, catalysts which contain amide functionality chemically bond into the polyurethane polymer during the reaction and are not released from the finished product. Catalyst structures that embody this concept are typically of low to moderate activity and promote both the blowing (water-isocyanate) and the gelling (polyol-isocyanate) reactions to varying extents.

U.S. Pat. No. 4,242,467 discloses the use of morpholino and piperazino substituted ureas as catalysts for producing polyurethane foams.

U.S. Pat. No. 4,644,017 discloses the use of certain diffusion stable amino alkyl ureas having tertiary amino groups in the production of a polyisocyanate addition product that does not discolor or change the constitution of surrounding materials. Specifically taught are Catalyst A and Catalyst D which are reaction products of dimethylaminopropylamine and urea.

U.S. Pat. No. 4,007,140 discloses the use of N,N'-bis(3-dimethylaminopropyl)urea as a low odor catalyst for the production of polyurethanes. The use of N-(3-dimethylaminopropyl)-formamide is also described as a catalyst to make polyurethane foams.

U.S. Pat. No. 4,012,445 discloses the use of beta-amino carbonyl compounds as catalysts for the production of polyurethane foams. In these catalysts, the beta-amino part is present as a dialkylamino or a N-morpholino or a N,N'-piperazino heterocyclic nucleus and the carbonyl part is present as an amido or ester group.

U.S. Pat. No. 4,735,970 discloses a process for the production of cellular polyurethanes using special amine-$CO_2$ adducts and homogeneous mixtures of these adducts. The use of N-(3-dimethylaminopropyl)-formamide is also described as a catalyst to make polyurethane foams.

U.S. Pat. No. 5,200,434 discloses the use of amide derivatives of alkylene oxide polyethers and their uses in polyurethane foam formulation.

U.S. Pat. Nos. 5,302,303, 5,374,486, and 5,124,367 disclose the use of fatty amido amines as a component necessary for the stabilization of isocyanate compositions containing flame-retardants. The shelf-life stability of isocyanate-reactive compositions is often adversely affected by the addition of flame-retardants, especially those based on phosphorous, zinc, antimony, and aluminum. The use of fatty amino amides improves the storage stability of these isocyanate mixtures.

BRIEF SUMMARY OF THE INVENTION

The present invention relates to a method for preparing a polyurethane foam which comprises reacting an organic polyisocyanate and a polyol in the presence of water as a blowing agent, a cell stabilizer, a gelling catalyst, and a tertiary amine amide catalyst composition. The catalyst composition is represented by the formula I:

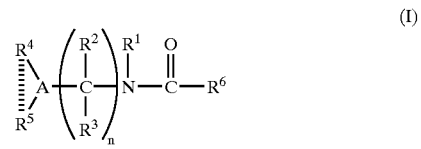

(I)

wherein A represents CH or N;
$R^1$ represents hydrogen or

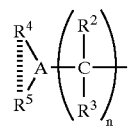

n is an integer from 1 to 3;
$R^2$ and $R^3$ each represent hydrogen or a $C_1$–$C_6$ linear or branched alkyl group;
$R^4$ and $R^5$ each represent a $C_1$–$C_6$ linear or branched alkyl group when A represents N, or together $R^4$ and $R^5$ represent a $C_2$–$C_5$ alkylene group when A represents N; or together $R^4$ and $R^5$ may be a $C_2$–$C_5$ alkylene group containing $NR^7$ when A represents CH or N, where $R^7$ is selected from the group consisting of hydrogen, a $C_1$–$C_4$ linear or branched alkyl group, and

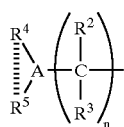

and; $R^6$ represents a $C_5$–$C_{35}$ linear or branched alkyl, alkenyl, or aryl group.

The present invention provides a reactive catalyst composition for making water-blown flexible polyurethane foam. The reactive catalysts may have reactive N—H groups from an amide functionality which enables the catalyst to react into the polyurethane matrix avoiding its release from the finished product.

The use of these catalysts in conjunction with gelling or blowing co-catalysts improves physical properties and enhances processibility of the foam. As gelling catalysts, these amide catalysts in conjunction with blowing co-catalysts improve the airflow of the foam. Improved airflow means improved porosity and openness of the foam which is an indication of improved dimensional stability of the foam. As gelling catalysts, these amide catalysts in conjunction with blowing co-catalysts also improve, i.e., reduce, the force-to-crush of the foam. Reduced force-to-crush means the foam is more easily compressed which is an important advantage for minimizing foam shrinkage during processing. As blowing catalysts, these amide catalysts in conjunction with gelling co-catalysts improve the load bearing properties of the foam. That such high molecular weight compounds have good catalytic activity in the production of a polyurethane is surprising, since the prior art suggests that they will react at the time of mixing and be incorporated into the polymer matrix early in the polyurethane process thus limiting their mobility.

DETAILED DESCRIPTION OF THE INVENTION

The present invention provides a method for making polyurethane foams using a reactive catalyst composition that comprises a tertiary amino alkyl amide. The amide is derived from a carboxylic acid of the type $R^6$—$CO_2H$, where $R^6$ is a C5–C35 linear or branched alkyl, alkenyl, or aryl group. The reactive catalyst compositions are typically used in the presence of a mono- and/or bis-(tertiary amino alkyl) urea gelling catalyst. The catalysts may contain reactive N—H groups from an amide functionality which enables the catalyst to react with, and be immobilized into, the polyurethane matrix producing polyurethane foams which have no amine odor or emissions.

The method of the present invention is more fully described in copending patent applications entitled "Tertiary Amino Alkyl Amide Catalysts Derived From Long Chain Alkyl And Fatty Carboxylic Acids" and "Tertiary Amino Alkyl Amide Catalysts For Improving The Physical Properties Of Polyurethane Foams", filed by applicant concurrently with the present patent application and assigned to the assignee of this application, which applications are hereby incorporated by reference.

The reactive catalyst composition of the present invention may be represented by three parts: the tertiary amine portion, the amide portion, and the long chain alkyl portion ($R^6$). The tertiary amine portion provides catalysis for producing polyurethane foams. The amide portion provides functionality which enables the catalyst to react into the polyurethane matrix such that the resulting polyurethane foams have no amine odor or emissions. The long chain alkyl portion enables the catalyst to promote the reaction between isocyanate and water causing blowing of the polymerizing mass to a sufficient degree as to provide a polyurethane foam with optimum physical properties.

Example 7 shows that conventional dialkyl amino amides, where the amide portion is derived from a simple carboxylic acid, such as formic acid or acetic acid, do not perform as well as their long chain alkyl chain or fatty acid counterparts. Amino amide catalysts, such as N-(3-dimethylaminopropyl)-formamide or N-(3-dimethylaminopropyl)-acetamide, do not perform by themselves according to the current industry standards (DABCO® BLV catalyst). The performance limitations of these compounds are very well recognized in the art and similar limitations are expected for related structures. Compounds such as N-(3-dimethylaminopropyl)-2-ethylhexamide or N-(3-dimethylaminopropyl)-lauramide would be expected to perform like N-(3-dimethylaminopropyl)-formamide and N-(3-dimethylaminopropyl)-acetamide with the additional limitation of having higher molecular weights that typically results in high usage levels.

In Example 8, N-(3-dimethylaminopropyl)-2-ethylhexamide (DMAPA-2-ethylhexamide) and N-(3-dimethylaminopropyl)-lauramide (DMAPA-lauramide) were compared with industry standards. The results showed that DMAPA-2-ethylhexamide can give, in contrast to DMAPA-acetamide and DMAPA-formamide, a stable foam with a rate of rise comparable to industry standards. Increasing the catalyst usage in the formulation does have an effect on the time to full rise in marked contrast with the formamide and the acetamide. The results show that DMAPA-lauramide can give stable foams with a rate of rise curves almost identical to industry standards. The data also shows that DMAPA-lauramide cannot perform by itself as the sole amine catalyst but requires the presence of a complementary catalyst, such as TEXACAT® ZF-10 catalyst.

In Example 9, DMAPA-2-ethyl hexamide and DMAPA-cocoamide are used together with a gelling catalyst (DABCO® NE1060 catalyst) in the absence of the blowing catalyst TEXACAT® ZF-10 catalyst. The rate of rise of these foams was compared with industry standards. The results show that the blowing catalyst TEXACAT® ZF-10 catalyst can be replaced by a combination of DABCO® NE1060 catalyst and DMAPA-amide catalysts to give a rate of rise profile that closely matches industry standards. The finding that compounds such as DMAPA-cocoamide and DMAPA-2-ethyl-hexamide can act as blowing catalysts and replace TEXACAT® ZF-10 catalyst is entirely surprising because the prior art teaches that blowing catalysts are typically compounds such as bis-dimethylaminoethyl ether or related structures. Thus, there is no precedent in the prior art that teaches the use of tertiary amino compounds with large alkyl or fatty groups as catalysts for promoting the reaction between water and isocyanate.

Surprisingly, the examples presented in this disclosure clearly show that long chain alkyl chain and fatty acid derivatves perform better than their lower molecular weight counterparts because the rate of rise profiles can, in most cases, be superimposed to the current fugitive industry standard (DABCO® BLV catalyst). The $Me_2N$-moiety in N-(3-dimethylaminopropyl)-formamide and in N-(3-dimethylaminopropyl)-acetamide seems to be catalytically less active than the $Me_2N$-moiety in, for example, N-(3-dimethylaminopropyl)-lauramide. Moreover, catalyst usage remained modest even though the molecular weights of the fatty acid catalysts are much larger than the molecular weight of the standards. Although the higher activity of the present catalyst compositions can explain their modest usage level, the reason for this enhanced activity is not obvious and not clearly understood. In addition, the benefit is not limited to a kinetic rate matching but also to a systematic improvement in the quality of the foams as evidence by the air-flow values. This can clearly be seen in Example 11 where the physical properties improve when using DABCO® NE1060 catalyst combined with DMAPA-cocoamide as compare with similar levels of DABCO® NE1060 catalyst used in the presence of TEXACAT® ZF-10 catalyst.

The catalyst compositions according to the present invention catalyze the reaction between an isocyanate functionality and an active hydrogen-containing compound, i.e., an alcohol, a polyol, an amine, or water. The catalyst compositions also catalyze the urethane (gelling) reaction of polyol hydroxyl groups with isocyanate to make polyurethanes and the blowing reaction of water with isocyanate to release carbon dioxide for making foamed polyurethanes.

The flexible polyurethane foam products are prepared using any suitable organic polyisocyanates known in the art including, for example, hexamethylene discarnate, phenylene discarnate, toluene discarnate (TDI) and 4,4'-diphenylmethane discarnate (MDI). Especially suitable are the 2,4- and 2,6-TDI's individually or together as their commercially available mixtures. Other suitable isocyanates are mixtures of diisocyanates known commercially as "crude MDI", marketed as PAPI by Dow Chemicals, which contains about 60% of 4,4'-diphenylmethane discarnate along with other isomeric and analogous higher polyisocyanates. Also suitable are "prepolymers" of these polyisocyanates comprising a partially prereacted mixture of a polyisocyanate and a polyether or polyester polyol.

Illustrative examples of suitable polyols as a component of the polyurethane composition are the polyalkylene ether and polyester polyols. The polyalkylene ether polyols include the poly(alkylene oxide) polymers such as poly (ethylene oxide) and poly(propylene oxide) polymers and copolymers with terminal hydroxyl groups derived from polyhydric compounds, including diols and triols; for example, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and similar low molecular weight polyols.

In the practice of this invention, a single high molecular weight polyether polyol may be used. Also, a mixture of high molecular weight polyether polyols such as mixtures of di- and tri-functional materials and/or different molecular weight or different chemical composition materials may be used.

Useful polyester polyols include those produced by reacting a dicarboxylic acid with an excess of a diol, for example, adipic acid with ethylene glycol or butanediol, or reaction of a lactone with an excess of a diol such as caprolactone with propylene glycol.

In addition to the polyester and polyethers polyols, the master batches, or premix compositions, frequently contain a polymer polyol. Polymer polyols are used in polyurethane foams to increase the foam's resistance to deformation, i.e., to increase the load-bearing properties of the foam. Currently, two different types of polymer polyols are used to achieve load-bearing improvement. The first type, described as a graft polyol, consists of a triol in which vinyl monomers are graft copolymerized. Styrene and acrylonitrile are the usual monomers of choice. The second type, a polyurea modified polyol, is a polyol containing a polyurea dispersion formed by the reaction of a diamine and TDI. Since TDI is used in excess, some of the TDI may react with both the polyol and polyurea. This second type of polymer polyol has a variant called PIPA polyol, which is formed by the in-situ polymerization of TDI and alkanolamine in the polyol. Depending upon the load-bearing requirements, polymer polyols may comprise 20–80% of the polyol portion of the master batch.

Other typical agents found in the polyurethane foam formulations include chain extenders such as ethylene glycol and butane diol; cross-linkers such as diethanolamine, diisopropanolamine triethanolamine and tripropanolamine; blowing agents such as water, CFCs, HCFCs, HFCs, pentane, and the like; and cell stabilizers such as silicone surfactants.

A general polyurethane flexible foam formulation containing a gelling and a blowing catalyst according to the invention would comprise the following components in parts by weight (pbw):

| | |
|---|---|
| Polyol | 20–100 |
| Polymer Polyol | 80–0 |
| Silicone Surfactant | 1–2.5 |
| Blowing agent | 2–4.5 |
| Crosslinker | 0.5–2 |
| Catalyst | 0.25–2 |
| Isocyanate Index | 70–115 |

The catalyst composition comprises a tertiary amino alkyl amide composition represented by the formula I:

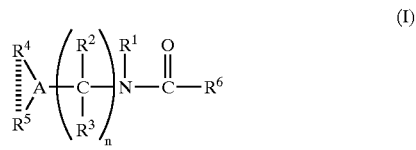

(I)

wherein A represents CH or N;

$R^1$ represents hydrogen or

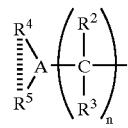

n is an integer from 1 to 3;

$R^2$ and $R^3$ each represent hydrogen or a $C_1$–$C_6$ linear or branched alkyl group;

$R^4$ and $R^5$ each represent a $C_1$–$C_6$ linear or branched alkyl group when A represents N, or together $R^4$ and $R^5$ represent a $C_2$–$C_5$ alkylene group when A represents N; or together $R^4$ and $R^5$ may be a $C_2$–$C_5$ alkylene group containing $NR^7$ when A represents CH or N, where $R^7$ is selected from the group consisting of hydrogen, a $C_1$–$C_4$ linear or branched alkyl group, and

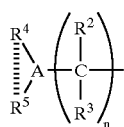

and; $R^6$ represents a $C_5$–$C_{35}$ linear or branched alkyl, alkenyl, or aryl group.

Preferably, $R^1$, $R^2$, and $R^3$ each represent hydrogen and $R^4$ and $R^5$ each represent a methyl group when A represents N. $R^4$ and $R^5$ together may represent —$CH_2CH_2N(CH_3)CH_2$— when A represents CH. Preferably, n represents 2 or 3.

Illustrative examples of dialkylamino amides derived from higher alkyl and fatty acids are: the N-(3-dimethylaminopropyl)-amides, the N-(2-dimethylaminoethyl)-amides, the N-methyl-3-aminoethyl pyrrolidine amides, the 4,10-diaza-4,10,10-trimethyl-7-oxa-undecaamine amides, and any dimethylamino- or dialkylamino-alkyl, or alkylsubstituted amides derived from 2-ethylhexanoic, coconut oil fatty, tall oil fatty, caproic, heptylic, caprylic, pelargonic, capric, hendecanoic, lauric, tridecanoic, myristic, pentadecanoic, palmitic, margaric, stearic, oleic, linoleic, linolenic, ricinoleic, nonadecanoic, arachidic, heneicosanoic, behenic, tricosanoic, lignoceric, pentacosanoic, cerotic, heptacosanoic, montanic, nonacosanoic, melissic, hentriacontanoic, dotriacontanoic, tritriacontanoic, tetracontanoic, hexatriacontanoic or their aliphatic or aromatic substituted derivatives such as 9- and 10-phenylstearic and related structures.

The preferred amides are N-(3-dimethylaminopropyl)-amides. The preferred acids are selected from the group consisting of 2-ethylhexanoic, coconut oil fatty, and tall oil fatty acids.

The amides are prepared by reacting a carboxylic acid and the corresponding tertiary alkyl amine in the appropriate molar ratios at elevated temperatures of from 80° C. to 300° C., preferably 100° C. to 200° C., with water being driven off. The amides can be further purified by distillation or chromatography as known in the art.

The amides can be used in conjunction with a gelling catalyst, such as a tertiary amine or a suitable transition metal catalyst, and/or a blowing catalyst depending upon the processing advantages desired.

Examples of suitable tertiary amine gelling catalysts include, but are not restricted to, diazabicyclooctane (triethylenediamine), supplied commercially as DABCO 33LV® catalyst by Air Products and Chemicals Inc., quinuclidine and substituted quinuclidines, substituted pyrrolidines and pyrrolizidines. Examples of suitable tertiary amine blowing catalysts include, but are not restricted to, bis-dimethylaminoethyl ether, commercially supplied as DABCO® BL11 catalyst by Air Products and Chemicals, Inc., pentamethyldiethylenetriamine and related compositions, higher permethylated polyamines, 2-[N-(dimethylaminoethoxyethyl)-N-methylamino]ethanol and related structures, alkoxylated polyamines, imidazole-boron compositions and amino propyl-bis(aminoethyl) ether compositions.

A catalytically effective amount of the catalyst composition comprising the amide and a tertiary amine gelling or blowing catalyst may be used in the polyurethane formulation. More specifically suitable amounts of the catalyst composition may range from about 0.01 to 10 parts by wt per 100 parts polyol (pphp) in the polyurethane formulation, preferably 0.05 to 2 pphp.

The catalyst composition may be used in combination with, or also comprise, other tertiary amines, organotin or carboxylate urethane catalysts well known in the urethane art.

Although the present invention has been described as useful for preparing flexible polyurethane foams, the invention may also be employed to prepare semi-flexible and rigid polyurethane foams. Rigid polyurethane foams can be distinguished from flexible polyurethane foams by the presence of higher isocyanurate levels in the rigid foam. Flexible foams typically use polymer polyol as part of the overall polyol content in the foam composition, along with conventional triols of 4000–5000 weight average molecular weight (Mw) and hydroxyl number (OH#) of 28–35. In contrast, rigid polyurethane foam compositions use 500–1000 Mw polyol with 3–8 hydroxyl functionalities and OH# of 160–700. Rigid foams can also be distinguished from the flexible foams by the isocyanate (NCO) index of the foam composition. Rigid foam compositions typically use a 100–300 NCO index whereas flexible foam compositions typically require a 70–115 NCO index.

A general polyurethane rigid insulating foam formulation containing the catalyst composition according to the invention would comprise the following components in parts by weight (pbw):

| | |
|---|---|
| Polyol | 100 |
| Silicone Surfactant | 1–3 |
| Blowing Agent | 0–50 |
| Water | 0–8 |
| Catalyst | 0.5–15 |
| Isocyanate Index | 80–300 |

For making lamination (insulation board) and appliance foams the NCO index is typically 100–300; for making open cell foam the NCO index is typically 100–120 and the foam is usually all water blown.

Semiflexible molded foams have been utilized for many applications in the automotive area. The major applications are instrument panels and interior trims. A typical semiflexible foam formulation containing the catalyst composition according to the invention comprise the following components in parts by weight (pbw):

| | |
|---|---|
| SPECFLEX NC 630 Polyol | 80.0 |
| SPECFLEX NC 710 | 20.0 |
| Copolymer | |
| Cross-linker | 1.5 |
| Water | 2.2 |
| Catalyst | 0.5–10 |
| Black Colorant | 0.3 |
| Adhesion Promoter | 2.0 |
| Cell Opener | 1.0 |
| Polymeric MDI, Index | 105 |

The two main components are the base polyol and copolymer polyol (CPP). The base polyol is utilized at levels between 70–100%. The molecular weight of base polyols range from 4500 to 6000 for triols and 2000 to 4000 for diols. Ethylene-oxide-capped polyether polyols have replaced most polyester polyols as the base polyol. The primary hydroxyl content is usually grater than 75% and the capping range is typically 10–20%. The other major component is CPP, which are used at levels of 0 to 20%. The base polyol and CPP are blended with low molecular weight cross linkers to build hardness and promote faster demolding. The level of cross linker varies depending on the hardness requirement of the finished part. Water levels are chosen to give free rise densities from 3 to 6 pounds. Cell openers are also utilized in semiflexible foams to reduce the internal foam pressure during the cure cycle and thus reduce pressure-relief voids and "parting lines". Adhesion promoters can be added, depending upon the quality of the vinyl skin, to improve the adhesion between the polyurethane foam and the vinyl skin. The use of the catalyst composition of the present invention can reduce the discoloration of the vinyl skin typically observed with conventional amine catalysts because the N—H group of the amide functionality can react with the isocyanate to form a covalent bond with the polyurethane polymer.

The present invention is further illustrated by the following examples, which are presented for purposes of demonstrating, but not limiting, the preparation of the compounds and compositions of this invention.

EXAMPLE 1

Synthesis of N-(3-dimethylaminopropyl)-acetamide (DMAPA-acetamide)

Into a 500 ml three necked round bottom flask equipped with a Teflon coated magnetic stir bar and a pressure equalizing dropping funnel was placed 83.8 g of 3-dimethylaminopropylamine (DMAPA). Excess acetic acid (210 g) was slowly added to the reaction mixture while the temperature was monitored with a thermocouple. At the end of the addition, the liquid was heated to reflux for five hours and the progress of the reaction was monitored by GC. Excess acetic acid was removed by distillation to give 118 g of N,N-dimethylaminopropylamino-acetamide as a pale yellow liquid.

EXAMPLE 2

Synthesis of N-(3-dimethylaminopropyl)-formamide (DMAPA-formamide)

Into a 500 ml three necked round bottom flask equipped with a Teflon coated magnetic stir bar and a pressure equalizing dropping funnel was placed 80 g of DMAPA. Excess formic acid (160 g) was slowly added to the reaction mixture while the temperature was monitored with a thermocouple. At the end of the addition, the liquid was heated to reflux for two hours and the progress of the reaction was monitored by GC. The product was distilled under reduced pressure to give 93.4 g of N,N-dimethylaminopropylamino-formamide as a clear and colorless liquid.

EXAMPLE 3

Synthesis of N-(3-dimethylaminopropyl)-2-ethyl-hexamide (DMAPA-2-ethyl-hexamide)

Into a 500 ml three necked round bottom flask equipped with a Teflon coated magnetic stir bar and a pressure equalizing dropping funnel was placed 100 g of DMAPA. Addition of 2-ethyl-hexanoic acid (120 g) was monitored with a thermocouple. At the end of the addition, the liquid was heated to reflux and the progress of the reaction was monitored by GC. At the end of the reaction, excess DMAPA was removed under reduced pressure to give 190 g of 3-N,N-dimethylamino)-1-(2-ethylhexanoyl)-propionamide as a clear yellow liquid.

EXAMPLE 4

Synthesis of N-(3-dimethylaminopropyl)-lauramide (DMAPA-lauramide)

Into a 500 ml three necked round bottom flask equipped with a Teflon coated magnetic stir bar and a pressure equalizing dropping funnel was placed 88 g of DMAPA. Lauric acid (100 g) was slowly added to the reaction mixture while the temperature was monitored with a thermocouple. At the end of the addition, the liquid was heated to reflux and as the reaction proceeded, water was removed. Once the reaction was completed, excess DMAPA was removed under reduced pressure to give 141 g of 3-(N,N-dimethylamino)-1-(lauroyl)-propionamide as a yellow solid. A 52% solution in DPG (dipropylene glycol) was used as catalyst.

EXAMPLE 5

Synthesis of N-(3-dimethylaminopropyl)-cocoamide (DMAPA-cocoamide)

Into a 500 ml three necked round bottom flask equipped with a Teflon coated magnetic stir bar and a pressure equalizing dropping funnel was placed 88 g of DMAPA. Coconut oil fatty acid (100 g) was slowly added to the reaction mixture while the temperature was monitored with a thermocouple and at the end of the addition, the liquid was heated to reflux. Water was periodically removed as the reaction proceeded. Once finished, the excess DMAPA was removed under reduced pressure to give 147 g of amide product as a pale yellow liquid that slowly solidified when sitting on the bench.

EXAMPLE 6

Synthesis of N-(3-dimethylaminopropyl)-tall oil amide (DMAPA-TOFA)

Into a 500 ml three necked round bottom flask equipped with a Teflon coated magnetic stir bar and a pressure equalizing dropping funnel was placed 26 g of DMAPA. Tall oil fatty acid (61 g) was slowly added to the reaction mixture while the temperature was monitored with a thermocouple and at the end of the addition, the liquid was heated to reflux. Water was periodically removed under reduced pressure as the reaction proceeded. Once finished, the excess DMAPA was removed under reduced pressure to give 74 g of amide product as an amber liquid.

EXAMPLE 7

Rate of Rise of Foams: DMAPA-formamide and DMAPA-acetamide vs. Industry Standards In this example, polyurethane foams were prepared in a conventional manner. The polyurethane formulation in parts by weight was:

| COMPONENT | PARTS |
| --- | --- |
| ARCOL ® E848[1] | 50.00 |
| ARCOL ® E851[2] | 50.00 |
| WATER | 2.34 |
| DABCO ® DC 5043[3] | 0.75 |
| DEOA-LF[4] | 1.76 |
| DABCO 33-LV ®[5] | 0.25 |
| DABCO ® BL-11[6] | 0.10 |
| TDI | 30.25 |
| Index | 100 |

[1–2]commercially available polyols;
[3]commercial silicon surfactant supplied by Air Products and Chemicals, Inc.;
[4]Cross-linker;
[5]DABCO 33-LV ® catalyst is a commercially available catalysts supplied by Air Products and Chemicals, Inc. (33% solution of triethylenediamine in dipropylene glycol);
[6]DABCO ® BL-11 catalyst is a commercially available catalyst supplied by Air Products and Chemical, Inc. (70% solution of bis-dimethylaminoethylether in dipropylene glycol)

For each foam made, the catalyst was added to 158 g of the above premix in a 32 oz (951 ml) paper cup and the formulation was mixed for 10 sec at 6,000 RPM using an overhead stirrer fitted with a 2 in (5.1 cm) diameter stirring paddle. Sufficient TDI 80 was added to make a 100 index foam [index=(mole NCO/mole of active hydrogen)×100] and the formulation was mixed well for 6 sec at 6,000 RPM using the same stirrer. The 32 oz (951 ml) cup was dropped through a hole in the bottom of a 128 oz (3804 ml) paper cup on a stand. The hole was sized to catch the lip of the 32 oz (951 ml) cup. The total volume of the foam container was 160 oz (4755 ml). Foams approximated this volume at the end of the foam forming process. Maximum foam height was recorded.

The following data provides a comparison of a combination of DMAPA-acetamide and TEXACAT® ZF-10 catalyst with the industry standard (DABCO 33-LV® and DABCO® BL-11 catalysts) and with standard non fugitive catalysts available in the market (NE 1060 and TEXACAT® ZF-10 catalysts):

The results showed that the foams obtained were of very poor quality and in one case, the foam collapsed. The extremely slow foam rise is evidenced by the time of full rise which is some cases surpassed the 180 seconds. The poor catalytic behavior cannot be corrected even when large amounts of catalysts were used.

EXAMPLE 8

Rate of Rise of Foams: DMAPA-2-Ethyl-hexamide and DMAPA-lauramide vs. Industry Standards In this example, DMAPA-2-ethyl hexamide and DMAPA-lauramide were compared with industries standards as described in the previous example. The data obtained can be summarized in the following tables:

| Gelling Catalyst DABCO 33-LV® | Blowing Catalyst DABCO® BL-11 | Gelling Catalyst DABCO® NE1060[1] | Blowing Catalyst TEXACAT® ZF-10[2] | DMAPA-acetamide | Cream Time (sec) | Cup 1 Time (sec) | String Gel | Full Rise |
|---|---|---|---|---|---|---|---|---|
| 0.25 | 0.1 | | | | 7.6 | 17.6 | 60.5 | 123.8 |
| | | 0.56 | 0.16 | | 7.4 | 14.8 | 56.6 | 106.5 |
| | | | 0.16 | 0.43 | 8.1 | 19.9 | 65.8 | Collapse |
| | | | 0.16 | 0.52 | 8.0 | 18.4 | Collapse | Collapse |

[1]DABCO® NE1060 catalyst is a commercially available catalyst supplied by Air Products and Chemicals, Inc. The catalysts is a 75% dipropylene glycol solution of N-(3-dimethylaminopropyl)-urea (87%) and N,N'-bis-(3-dimethylamino)-urea (13%);
[2]TEXACAT® ZF-10 catalyst is a commercially available catalysts based on 2-[N-(dimethylaminoethoxyethyl)-N-methylamino]ethanol.

Thus, using DMAPA-acetamide as gelling catalyst in substitution of DABCO® 33-LV or DABCO® NE1060 catalyst caused a premature collapse of the foam. The collapse is presumably due to the poor gelling ability of DMAPA-acetamide when tested against this formulation. In another attempt, DMAPA-formamide was tested using a similar procedure and the data can be summarized in the table below:

| Gelling Catalyst DABCO 33-LV® | Blowing Catalyst DABCO® BL-11 | Gelling Catalyst DABCO® NE1060 | Blowing Catalyst TEXACAT® ZF-10 | DMAPA-formamide | Cream | Cup 1 | String Gel | Full Rise |
|---|---|---|---|---|---|---|---|---|
| 0.25 | 0.1 | | | | 7.6 | 17.6 | 60.5 | 123.8 |
| | | 0.56 | 0.16 | | 7.4 | 14.8 | 56.6 | 106.5 |
| | | | 0.16 | 0.39 | 8.8 | 31.9 | 89.3 | 180+ |
| | | | 0.16 | 0.50 | 12.5 | 31.3 | 88.8 | 180+ |
| | | | 0.16 | 1.00 | 10.3 | 32.3 | 79.5 | 172.3 |
| | | | 0.16 | 1.25 | 9.5 | 31.4 | 73.9 | Collapse |

| Gelling Catalyst DABCO 33-LV® | Blowing Catalyst DABCO® BL-11 | Gelling Catalyst DABCO® NE1060 | Blowing Catalyst TEXACAT® ZF-10 | DMAPA-2-ethyl hexamide | Cream | Cup 1 | String Gel | Full Rise |
|---|---|---|---|---|---|---|---|---|
| 0.25 | 0.1 | | | | 7.6 | 17.6 | 60.5 | 123.8 |
| | | 0.56 | 0.16 | | 7.4 | 14.8 | 56.6 | 106.5 |
| | | | 0.16 | 0.50 | 8.8 | 20.5 | 64.6 | 177.2 |
| | | | 0.16 | 0.62 | 7.7 | 17.9 | 60.6 | 131.8 |
| | | | 0.16 | 0.75 | 7.7 | 18.4 | 59.9 | 127.3 |
| | | | 0.16 | 0.87 | 7.5 | 17.7 | 60.7 | 129.0 |
| | | | 0.16 | 1.00 | 7.6 | 16.2 | 62.0 | 126.7 |

The results obtained clearly indicate that DMAPA-2-ethyl hexamide can give, in contrast to DMAPA-acetamide and DMAPA-formamide, a stable foam with a rate of rise comparable to industry standards. It is also clear that increasing the catalyst usage in the formulation does have an effect on the time to full rise in markedly contrast with the formamide and the acetamide.

| Gelling Catalyst DABCO 33-LV® | Blowing Catalyst DABCO® BL-11 | Gelling Catalyst DABCO® NE1060 | Blowing Catalyst TEXACAT® ZF-10 | DMAPA-lauramide | Cream | Cup 1 | String Gel | Full Rise |
|---|---|---|---|---|---|---|---|---|
| 0.25 | 0.1 | | | | 7.6 | 17.6 | 60.5 | 123.8 |
| | | 0.56 | 0.16 | | 7.4 | 14.8 | 56.6 | 106.5 |
| | | | 0.16 | 1.31 | 7.3 | 17.8 | 58.2 | 135.4 |
| | | | 0.16 | 1.63 | 7.5 | 16.9 | 54.5 | 119.9 |
| | | | 0.16 | 1.95 | 7.1 | 15.7 | 55.4 | 113.2 |
| | | | 0.16 | 2.34 | 6.8 | 15.1 | 57.6 | 121.6 |
| | | | | 1.63 | 10.2 | 30.0 | 78.5 | 180+ |
| | | | | 1.96 | 8.40 | 27.0 | 74.8 | 180+ |
| | | | | 2.30 | 8.40 | 25.1 | 68.2 | 180+ |
| | | | | 2.80 | 8.8 | 22.2 | 66.3 | 180+ |

The results show that DMAPA-lauramide can also give stable foams with a rate of rise curves almost identical to industry standards. The data also shows that DMAPA-lauramide cannot perform by itself as the sole amine catalysts but it requires the presence of a blowing catalyst, such as TEXACAT® ZF-10 catalyst.

EXAMPLE 9

Rate of Rise of Foams: DMAPA-amides and Alkyl Substituted Ureas without TEXACATt® ZF-10 Blowing Catalyst In this example, DMAPA-2-ethyl hexamide and DMAPA-cocoamide are used together with DABCO® NE1060 catalyst in the absence of the TEXACAT® ZF-10 blowing catalyst. The rate of rise of these foams was compared with industries standards as described in the previous examples. The data obtained is summarized below:

| | | | | DMAPA-2-Ethyl Hexamide | | | | |
|---|---|---|---|---|---|---|---|---|
| Gelling Catalyst DABCO 33-LV® | Blowing Catalyst DABCO® BL-11 | Gelling Catalyst DABCO® NE1060 | Blowing Catalyst TEXACAT® ZF-10 | DMAPA-2-ethyl hexamide | Cream (sec) | Cup 1 (sec) | String Gel (sec) | Full Rise (sec) |
| 0.25 | 0.1 | | | | 7.6 | 17.6 | 60.5 | 123.8 |
| | | 0.56 | 0.16 | | 7.4 | 14.8 | 56.6 | 106.5 |
| | | 0.70 | | 0.20 | 8.8 | 18.8 | 61.3 | 127.0 |
| | | 0.90 | | 0.24 | 7.9 | 17.6 | 60.7 | 113.6 |
| | | 0.70 | | 0.40 | 8.9 | 19.6 | 61.2 | 146.7 |

| Gelling Catalyst DABCO 33-LV® | Blowing Catalyst DABCO® BL-11 | Gelling Catalyst DABCO® NE1060 | Blowing Catalyst TEXACAT® ZF-10 | DMAPA-cocoamide | Cream (sec) | Cup 1 (sec) | String Gel (sec) | Full Rise (sec) |
|---|---|---|---|---|---|---|---|---|
| 0.25 | 0.1 | | | | 7.6 | 17.6 | 60.5 | 123.8 |
| | | 0.56 | 0.16 | | 7.4 | 14.8 | 56.6 | 106.5 |
| | | 0.90 | | 0.30 | 8.1 | 16.5 | 60.6 | 104.7 |
| | | 0.70 | | 0.60 | 8.7 | 17.9 | 61.4 | 128.4 |
| | | 0.56 | | 0.64 | 8.3 | 19.3 | 60.7 | 136.3 |

The results show that the blowing catalyst TEXACAT® ZF-10 catalyst can be replaced by a combination of DABCO® NE1060 and DMAPA-amide catalysts to give a rate of rise profile that closely match the standards. In other words, DMAPA-cocoamide and DMAPA-2-ethyl-hexamide can act as blowing catalysts and replace ZF-10.

EXAMPLE 10

Physical Properties of Automotive Cushions Made with DMAPA-cocoamide Blowing Catalyst In this example, automotive cushions were made using DMAPA-cocoamide as the main blowing agent and DABCO® NE1060 gelling catalyst. The foams were made in a heated test block mold at 160° F. (71° C.). In all cases the foam reactivity was matched by extrusion time which measures reaction progression and provides some indication of extent of cure.

The force-to-crush results were obtained using a mechanical devise equipped with a 1000 lb (453.6 Kg) capacity pressure transducer mounted between the 50 square inch (322.6 cm2) circular plate and the drive shaft. The Dayton motor specifications, model 4Z528, include a ⅙ horsepower (124.3 J/s) with F/L rpm of 1800 and F/L torque of 5.63 in-lb (6.36×104 Nm). The actual pressure is shown on a digital display. The foam pad is compressed to 50% of its original thickness and the force necessary to achieve the compression is recorded in whole pounds (newtons). A cycle takes 24 seconds to complete and the actual crushing of the foam occurs within 7–8 seconds. This device mimics the ASTM D-3574, Indentation Force Deflection Test, and provides a numerical value for 1 minute post demolded foam initial hardness or softness.

| Gelling Catalyst DABCO 33-LV® | Blowing Catalyst DABCO® BL-11 | Gelling Catalyst DABOC® NE1060 | Blowing Catalyst TEXACAT® ZF-10 | DMAPA-cocoamide | Cushion density (Kg/m$^3$) | Force to Crush (lbf) |
|---|---|---|---|---|---|---|
| 0.25 | 0.1 | | | | | 144.6 |
| | | 0.56 | 0.16 | | | 181.9 |
| | | 0.70 | | 0.50 | 48.6 | 146.8 |
| | | 0.60 | | 0.60 | 48.6 | 145.0 |
| | | 0.50 | | 0.70 | 48.0 | 137.2 |

Using DMAPA-cocoamide as a blowing agent, instead of TEXACAT® ZF-10 catalyst, has the clear advantage that the force-to-crush values measured are significantly lower than the values obtained with ZF-10. Thus, DMAPA-amides derived from higher alkyl or fatty acids can not only act as blowing agents and replace conventional catalysts such as ZF-10 but also can improve some physical properties such as force-to-crush.

EXAMPLE 11

Physical Properties of Automotive Cushions Made with DMAPA-cocoamide Blowing Catalyst In this example, other physical properties were measured to determine the additional benefits of this reactive catalyst composition. Automotive cushions were made as explained above and the physical properties are shown below.

| Catalyst Combination | Gelling Catalyst DABCO 33-LV ® | Blowing Catalyst DABCO ® BL-11 | Gelling Catalyst DABCO ® NE1060 | Blowing Catalyst TEXACAT ® ZF-10 | DMAPA-cocoamide |
|---|---|---|---|---|---|
| A | 0.25 | 0.10 | | | |
| B | | | 0.56 | 0.16 | |
| C | | | 0.70 | | 0.50 |
| D | | | 0.60 | | 0.60 |
| E | | | 0.50 | | 0.70 |

Physical Properties

| CATALYST | TEAR (lbf) | TENSILE (psi) | DENSITY (lb/cu.ft) | % Break Elongation | AIR FLOW (SCFM) |
|---|---|---|---|---|---|
| A | 1.78 ± 0.18 | 27.7 ± 3.60 | 2.83 ± 0.11 | 92.6 ± 8.2 | 2.97 ± 0.68 |
| B | 1.63 ± 0.20 | 27.7 ± 2.93 | 2.73 ± 0.03 | 97.1 ± 6.7 | 2.57 ± 1.36 |
| C | 1.56 ± 0.35 | 26.5 ± 2.28 | 2.75 ± 0.05 | 95.4 ± 5.9 | 2.60 ± 1.23 |
| D | 1.58 ± 0.32 | 26.2 ± 1.80 | 2.72 ± 0.06 | 97.5 ± 6.7 | 2.58 ± 0.91 |
| E | 1.67 ± 0.27 | 28.4 ± 4.04 | 2.78 ± 0.08 | 95.0 ± 10.9 | 2.94 ± 1.57 |

The table above shows that in going from C to E, the DABCO® NE1060 catalyst was progressively and partially replace by some DMAPA-cocoamide and the effect of such changes caused the physical properties of the foam to approach consistently the industry standard A. This demonstrate, that the physical properties of foams can be improved and systematically changed to resemble foams made with fugitive catalysts that are today industry standards.

Other physical properties showed a similar trend and they are briefly summarized in the following table:

| CATALYST | Humid Age 50% Compression Set | 50% Compression Set | Japanese Wet Set | Hysteresis % |
|---|---|---|---|---|
| A | 9.00 ± 0.63 | 5.77 ± 0.73 | 16.8 ± 3.4 | 21.94 |
| B | 12.27 ± 0.79 | 7.76 ± 0.61 | 21.2 ± 2.9 | 20.85 |
| C | 12.50 ± 0.61 | 7.89 ± 0.81 | 16.9 ± 1.9 | 20.89 |
| D | 12.48 ± 1.12 | 7.70 ± 1.14 | 14.9 ± 1.0 | 21.02 |
| E | 11.97 ± 0.45 | 7.96 ± 0.61 | 15.2 ± 1.8 | 21.10 |

What is claimed is:

1. A method for preparing a polyurethane foam which comprises reacting an organic polyisocyanate and a polyol in the presence of water as a blowing agent, a cell stabilizer, a gelling catalyst, and a catalyst composition represented by the formula I:

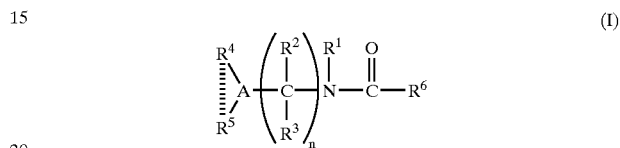

wherein A represents CH or N;
$R^1$ represents hydrogen or

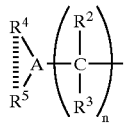

n is an integer from 1 to 3;
$R^2$ and $R^3$ each represent hydrogen or a $C_1$–$C_6$ linear or branched alkyl group;
$R^4$ and $R^6$ each represent a $C_1$–$C_6$ linear or branched alkyl group when A represents N, or together $R^4$ and $R^5$ represent a $C_2$–$C_5$ alkylene group when A represents N; or together $R^4$ and $R^5$ represents a $C_2$–$C_5$ alkylene group containing $NR^7$ when A represents CH or N, where $R^7$ is selected from the group consisting of hydrogen, a $C_1$–$C_4$ linear or branched alkyl group, and

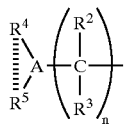

and; $R^6$ represents a $C_5$–$C_{35}$ linear or branched alkyl, alkenyl, or aryl group.

2. The method of claim 1, wherein $R^1$, $R^2$, and $R^3$ each represent hydrogen.

3. The method of claim 1, wherein $R^4$ and $R^5$ each represent a methyl group when A represents N.

4. The method of claim 1, wherein $R^4$ and $R^5$ together represent —$CH_2CH_2N(CH_3)CH_2$— when A represents CH.

5. The method of claim 1, wherein n represents 2 or 3.

6. The method of claim 1, wherein the catalyst composition is an N-(3-dimethylaminopropyl)-amide derived from an acid selected from the group consisting of 2-ethylhexanoic, coconut oil fatty, tall oil fatty, caproic, heptylic, caprylic, pelargonic, capric, hendecanoic, lauric, tridecanoic, myristic, pentadecanoic, palmitic, margaric, stearic, oleic, linoleic, linolenic, ricinoleic, nonadecanoic, arachidic, heneicosanoic, behenic, tricosanoic, lignoceric, pentacosanoic, cerotic, heptacosanoic, montanic, nonacosanoic, melissic, hentriacontanoic, dotriacontanoic, tritriacontanoic, tetracontanoic, hexatriacontanoic, 9-phenylstearic, and 10-phenylstearic acid.

7. The method of claim 6, wherein the acid is selected from the group consisting of 2-ethylhexanoic, coconut oil fatty, and tall oil fatty acids.

8. The method of claim 1, wherein the catalyst composition is an N-(2-dimethylaminoethyl)-amide derived from an acid selected from the group consisting of 2-ethylhexanoic, coconut oil fatty, tall oil fatty, caproic, heptylic, caprylic, pelargonic, capric, hendecanoic, lauric, tridecanoic, myristic, pentadecanoic, palmitic, margaric, stearic, oleic, linoleic, linolenic, ricinoleic, nonadecanoic, arachidic, heneicosanoic, behenic, tricosanoic, lignoceric, pentacosanoic, cerotic, heptacosanoic, montanic, nonacosanoic, melissic, hentriacontanoic, dotriacontanoic, tritriacontanoic, tetracontanoic, hexatriacontanoic, 9-phenylstearic, and 10-phenylstearic acid.

9. The method of claim 8, wherein the acid is selected from the group consisting of 2-ethylhexanoic, coconut oil fatty, and tall oil fatty acids.

10. The method of claim 1, wherein the catalyst composition is an N-methyl-3-aminoethyl pyrrolidine amide derived from an acid selected from the group consisting of 2-ethylhexanoic, coconut oil fatty, tall oil fatty, caproic, heptylic, caprylic, pelargonic, capric, hendecanoic, lauric, tridecanoic, myristic, pentadecanoic, palmitic, margaric, stearic, oleic, linoleic, linolenic, ricinoleic, nonadecanoic, arachidic, heneicosanoic, behenic, tricosanoic, lignoceric, pentacosanoic, cerotic, heptacosanoic, montanic, nonacosanoic, melissic, hentriacontanoic, dotriacontanoic, tritriacontanoic, tetracontanoic, hexatriacontanoic, 9-phenylstearic, and 10-phenylstearic acid.

11. The method of claim 10, wherein the acid is selected from the group consisting of 2-ethylhexanoic, coconut oil fatty, and tall oil fatty acids.

12. The method of claim 1, wherein the catalyst composition is a 4,10-diaza-4,10,10-trimethyl-7-oxa-undecaamine amide derived from an acid selected from the group consisting of 2-ethylhexanoic, coconut oil fatty, tall oil fatty, caproic, heptylic, caprylic, pelargonic, capric, hendecanoic, lauric, tridecanoic, myristic, pentadecanoic, palmitic, margaric, stearic, oleic, linoleic, linolenic, ricinoleic, nonadecanoic, arachidic, heneicosanoic, behenic, tricosanoic, lignoceric, pentacosanoic, cerotic, heptacosanoic, montanic, nonacosanoic, melissic, hentriacontanoic, dotriacontanoic, tritriacontanoic, tetracontanoic, hexatriacontanoic, 9-phenylstearic, and 10-phenylstearic acid.

13. The method of claim 12, wherein the acid is selected from the group consisting of 2-ethylhexanoic, coconut oil fatty, and tall oil fatty acids.

14. The method of claim 1, wherein the catalyst composition is N-(3-dimethylaminopropyl)-2-ethyl-hexamide.

15. The method of claim 1, wherein the catalyst composition is N-(3-dimethylaminopropyl)-cocoamide.

16. The method of claim 1, wherein the catalyst composition is N-(3-dimethylaminopropyl)-tall oil amide.

17. The method of claim 1, wherein the gelling catalyst is a mono- and/or bis-(tertiary amino alkyl) urea selected from the group consisting of diazabicyclooctane (triethylenediamine), quinuclidine, substituted quinuclidines, substituted pyrrolidines, and substituted pyrrolizidines.

18. The method of claim 1, which comprises reacting the following components in parts by weight (pbw):

| | |
|---|---|
| Polyol | 20–100 |
| Polymer Polyol | 80–0 |
| Silicone Surfactant | 1–2.5 |
| Blowing agent | 2–4.5 |
| Crosslinker | 0.5–2 |
| Catalyst | 0.25–2 |
| Isocyanate Index | 70–115 |

19. In a method for preparing a polyurethane foam which comprises reacting an organic polyisocyanate and a polyol in the presence of water as a blowing agent, a cell stabilizer, a gelling catalyst, and a catalyst composition, the improvement of enabling the reaction between water and isocyanate to cause blowing of the foam while maintaining and controlling the physical properties of the foam which comprises using a catalyst composition represented by the formula I:

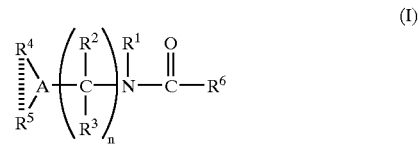

wherein A represents CH or N;
$R^1$ represents hydrogen or

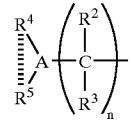

n is an integer from 1 to 3;
$R^2$ and $R^3$ each represent hydrogen or a $C_1$–$C_6$ linear or branched alkyl group;
$R^4$ and $R^5$ each represent a $C_1$–$C_6$ linear or branched alkyl group when A represents N, or together $R^4$ and $R^5$ represent a $C_2$–$C_5$ alkylene group when A represents N; or together $R^4$ and $R^5$ represents a $C_2$–$C_5$ alkylene group containing $NR^7$ when A represents CH or N, where $R^7$ is selected from the group consisting of hydrogen, a $C_1$–$C_4$ linear or branched alkyl group, and

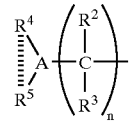

and; $R^6$ represents a $C_5$–$C_{35}$ linear or branched alkyl, alkenyl, or aryl group.

* * * * *

UNITED STATES PATENT AND TRADEMARK OFFICE
CERTIFICATE OF CORRECTION

PATENT NO.   : 6,759,447 B1  
DATED        : July 6, 2004  
INVENTOR(S)  : Juan Jesus Burdeniuc et al.

It is certified that error appears in the above-identified patent and that said Letters Patent is hereby corrected as shown below:

Column 18,  
Line 34, delete "$R^6$" and substitute therefor -- $R^5$ --

Signed and Sealed this

Twenty-third Day of November, 2004

JON W. DUDAS  
*Director of the United States Patent and Trademark Office*